United States Patent [19]
Yamamoto et al.

[11] Patent Number: 6,019,606
[45] Date of Patent: Feb. 1, 2000

[54] ROBOT TEACHING MACHINE

[75] Inventors: Katsumi Yamamoto, Takahama; Tadashi Koyama; Shinichi Sugita, both of Chiryu; Toshiro Itaya, Anjyo, all of Japan

[73] Assignee: Toyoda Koki Kabushiki Kaisha, Kariya, Japan

[21] Appl. No.: 08/967,111

[22] Filed: Nov. 10, 1997

[30] Foreign Application Priority Data

Nov. 8, 1996 [JP] Japan .................................. 8-295577

[51] Int. Cl.⁷ .................................................. G09B 9/08
[52] U.S. Cl. ................................................................ 434/45
[58] Field of Search ............................ 434/247, 45, 365, 434/219; 901/3, 10, 15, 16, 17, 18

[56] References Cited

U.S. PATENT DOCUMENTS

| | | | |
|---|---|---|---|
| 3,631,737 | 1/1972 | Wells | 74/469 |
| 4,484,413 | 11/1984 | Yamamoto et al. . | |
| 4,498,259 | 2/1985 | Yamamoto et al. . | |
| 4,897,586 | 1/1990 | Nakata et al. . | |
| 5,020,001 | 5/1991 | Yamamoto et al. . | |
| 5,184,601 | 2/1993 | Putman | 901/17 |
| 5,617,515 | 4/1997 | MacLaren et al. . | |
| 5,846,086 | 12/1998 | Bizzi et al. | 434/247 |
| 5,938,565 | 8/1999 | Bernacki | 434/247 |

FOREIGN PATENT DOCUMENTS

| | | |
|---|---|---|
| 59-214585 | 12/1984 | Japan . |
| 9-193064 | 7/1997 | Japan . |

*Primary Examiner*—Valencia Martin-Wallace
*Assistant Examiner*—John Paradiso
*Attorney, Agent, or Firm*—Oblon, Spivak, McClelland, Maier & Neustadt, P.C.

[57] ABSTRACT

A robot teaching machine according to the present invention includes a guiding tool having a first angle sensor, a coordinate detector having a plurality of rotating portions and a second angle sensor for detecting a rotational angle of each of the rotating portions, a first motion transfer member for detecting a distance between the guiding tool and the coordinate detector that are connected with each other, a second motion transfer member for connecting the guiding tool and the coordinate detector and detecting an attitude of the guiding tool, and a coordinate converter for deriving a three-dimensional position and an attitude of the guiding tool from values detected by the first and the second angle sensors, respectively. The first motion transfer member and the second motion transfer member independently work for providing precise guiding data.

6 Claims, 7 Drawing Sheets

ROBOT TEACHING MACHINE

INCORPORATION BY REFERENCE

The entire disclosure of Japanese Patent Application No. Hei 8-29557 filed on Nov. 8, 1996 including the specification, drawings and abstract is incorporated herein by reference in its entirety.

BACKGROUND OF THE INVENTION

1. Field of the Invention

The present invention relates to a robot teaching machine that uses a dummy tool operated by an operator so as to guide a robot to a precise working position on a workpiece.

2. Description of the Related Art

Japanese Patent Application Laid-Open No. Hei 8-8221 (Application date: Jan. 22, 1996) discloses a robot teaching machine, which has been filed by the same applicant of the present invention.

Figure 1:
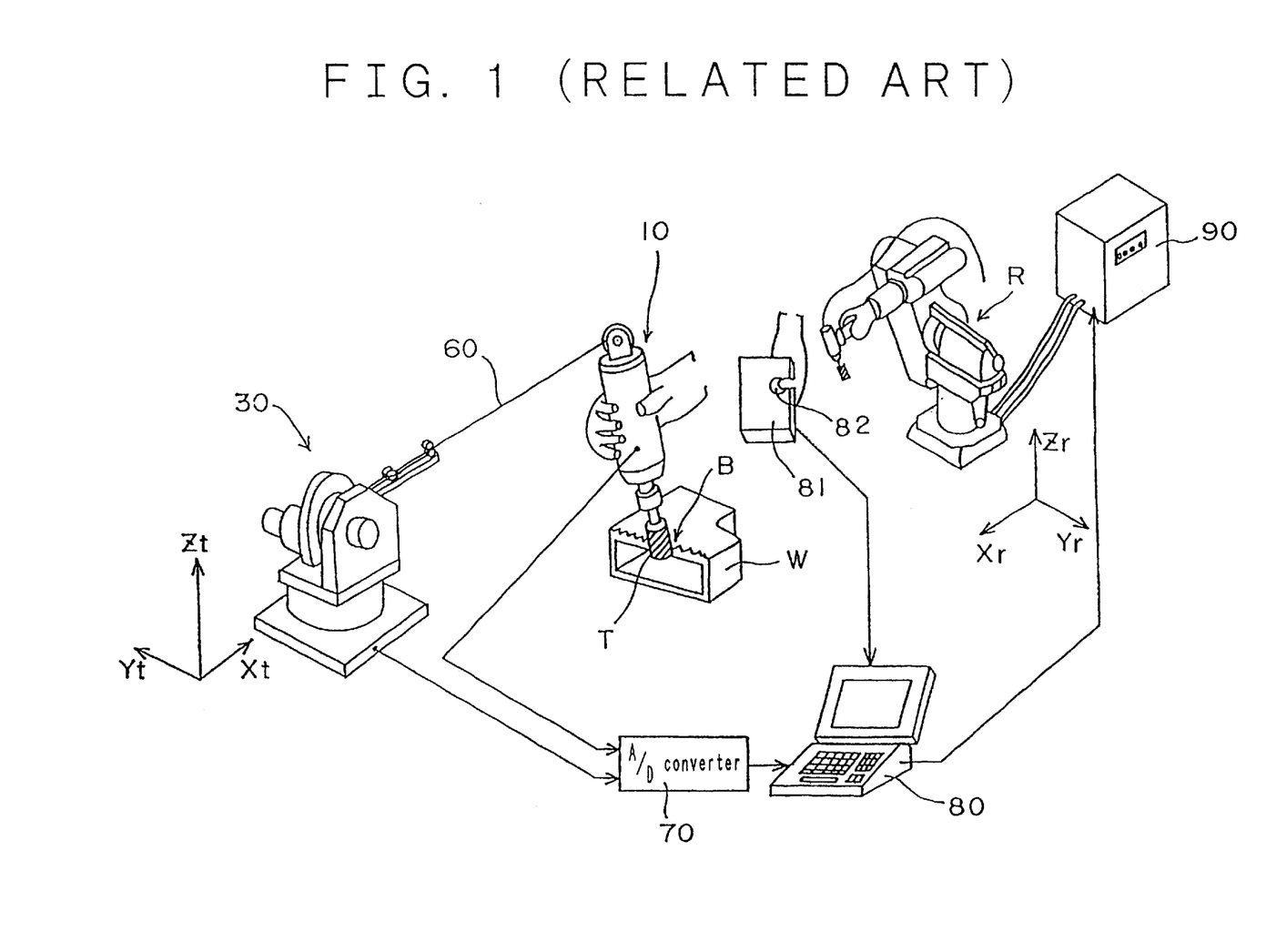
FIG. 1 is a schematic view of a conventional robot teaching machine.

As shown in FIG. 1, the above-identified robot teaching machine is provided with a teaching pen 10 having a dummy tool T fitted therein. The dummy tool T has the same shape as that of the tool used for actual working operations. An operator takes a grip of the teaching pen 10 by one hand and also a teaching pendant 81 by the other hand to bring the dummy tool T into a desired guiding position on a workpiece W. The operator, then, depresses a guiding button 82 on the teaching pendant 81. In response to depression of the guiding button 82, a position defined as a three-dimensional coordinate and an attitude (inclined amount) of the teaching pen 10 are stored as guiding data.

The position of the teaching pen 10 defined as the three-dimensional coordinate is detected by a teaching compass 30 that is connected with the teaching pen 10 via a wire 60 and follows the three-dimensional movement of the teaching pen 10.

The teaching compass 30 detects a distance between the teaching pen 10 and the teaching compass 30 based on a two-dimensional position of the wire 60 and an amount of rotation of a take-up reel provided with the teaching compass 30 at a time when the wire 60 is supplied therefrom. The three-dimensional coordinate position of the teaching pen 10 is detected in the aforementioned manner.

The wire 60 that connects the teaching pen 10 with the teaching compass 30 is constantly kept under tension by a force generated by the take-up reel such that the movement of the teaching pen 10 is precisely transferred to the teaching compass 30. Such tensile force applied to the wire 60 allows the teaching compass 30 to follow the movement of the teaching pen 10 precisely.

The conventional robot teaching machine uses only the wire 60 as a motion transfer member connecting the teaching pen 10 with the teaching compass 30 for following the three-dimensional movement of the teaching pen 10. The above construction often prevents the teaching compass 30 from following the movement of the teaching pen 10 precisely because of the friction generated between bearings that support the respective rotating portions of the teaching compass 30. A winding force of the take-up reel may be increased to improve the following capability of the teaching compass 30. In this case, however, the teaching pen 10 is likely to become unnecessarily inclined during guiding operations, thus requiring additional time period for corrective operations.

SUMMARY OF THE INVENTION

It is thus an object of the present invention to provide a robot teaching machine that is capable of solving the aforementioned problems by precisely following the dummy tool movement to guide a robot to a precise working position of a workpiece.

According to the present invention, there is provided a robot teaching machine including a guiding tool provided with a first angle sensor, a coordinate detector provided with a plurality of rotating portions and a second angle sensor for detecting a rotational angle of each of the rotating portions, a first motion transfer member for detecting a distance between the guiding tool and the coordinate detector that are connected with each other, a second motion transfer member for connecting the guiding tool and the coordinate detector and detecting an attitude of the guiding tool, and a coordinate converter for deriving a three-dimensional coordinate position and the attitude of the guiding tool from values detected by the first and the second angle sensors respectively.

In the robot teaching machine of the present invention, a joint portion between the second motion transfer member and the guiding tool and a joint portion between the second motion transfer member and the coordinate detector are maintained with at least three end points respectively.

In the robot teaching machine of the present invention, the second motion transfer member further provides an expansible portion.

In the aforementioned robot teaching machine, the first motion transfer member and the second motion transfer member are provided separately each other so that each data of the three-dimensional coordinate position and the attitude is more precise.

The joint portion between the second motion transfer member and the dummy tool and the joint portion between the second motion transfer member and the three-dimensional coordinate position detection means are maintained with at least three end points respectively. When the second motion transfer member starts following the dummy tool movement, each of the above three end points for connecting the three-dimensional coordinate position detection means therewith receives a uniform tensile force. This allows the three-dimensional coordinate position detection means to precisely follow the dummy tool movement.

The movement of the dummy tool is transferred to the three-dimensional coordinate position detection means via the second motion transfer member. An elastic portion provided with the second motion transfer member serves to connect the dummy tool and the three-dimensional coordinate position detection means such that a tensile force is constantly applied therebetween. The movement of the dummy tool, thus, can be transferred to the three-dimensional coordinate position detection means precisely.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENTS

A preferred embodiment of a robot teaching machine of the present invention will now be described with reference to the accompanying drawings.

Figure 2:
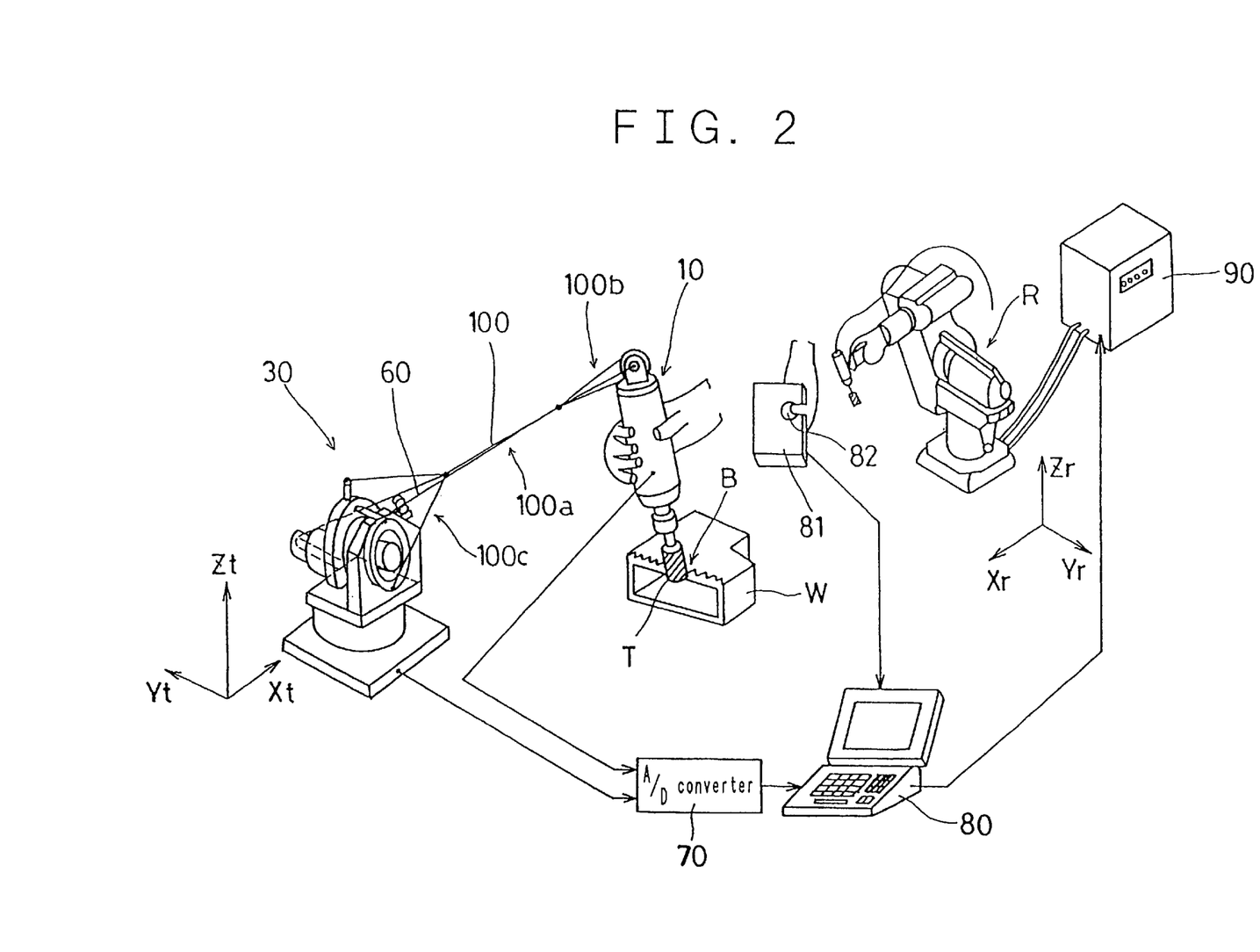
FIG. 2 is a schematic view of a robot teaching machine according to an embodiment of the present invention.

FIG. 2 is a schematic view of a robot teaching machine according to an embodiment of the present invention.

Referring to FIG. 2, a teaching pen 10 is provided with a dummy tool T that is shaped in the same manner as the tool used for actual working operations. The teaching pen 10 is further provided with a sensor (described later) for detecting an attitude (inclined angle) of the dummy tool T. In the case of guiding a robot, an operator brings the teaching pen 10 into the position such that the dummy tool T is abutted on a workpiece W.

A teaching compass 30 detects a three-dimensional coordinate position of the teaching pen 10. The teaching compass 30 is connected with the teaching pen 10 via a wire 60 used for detecting a distance therebetween and a motion transfer member 100 for transferring the movement of the teaching pen 10 to the teaching compass 30. The teaching compass 30 may be disposed on a bed around a table on which a workpiece is set or on a guard which keeps operators from entering a working area so as to be located above the robot.

Figure 3:
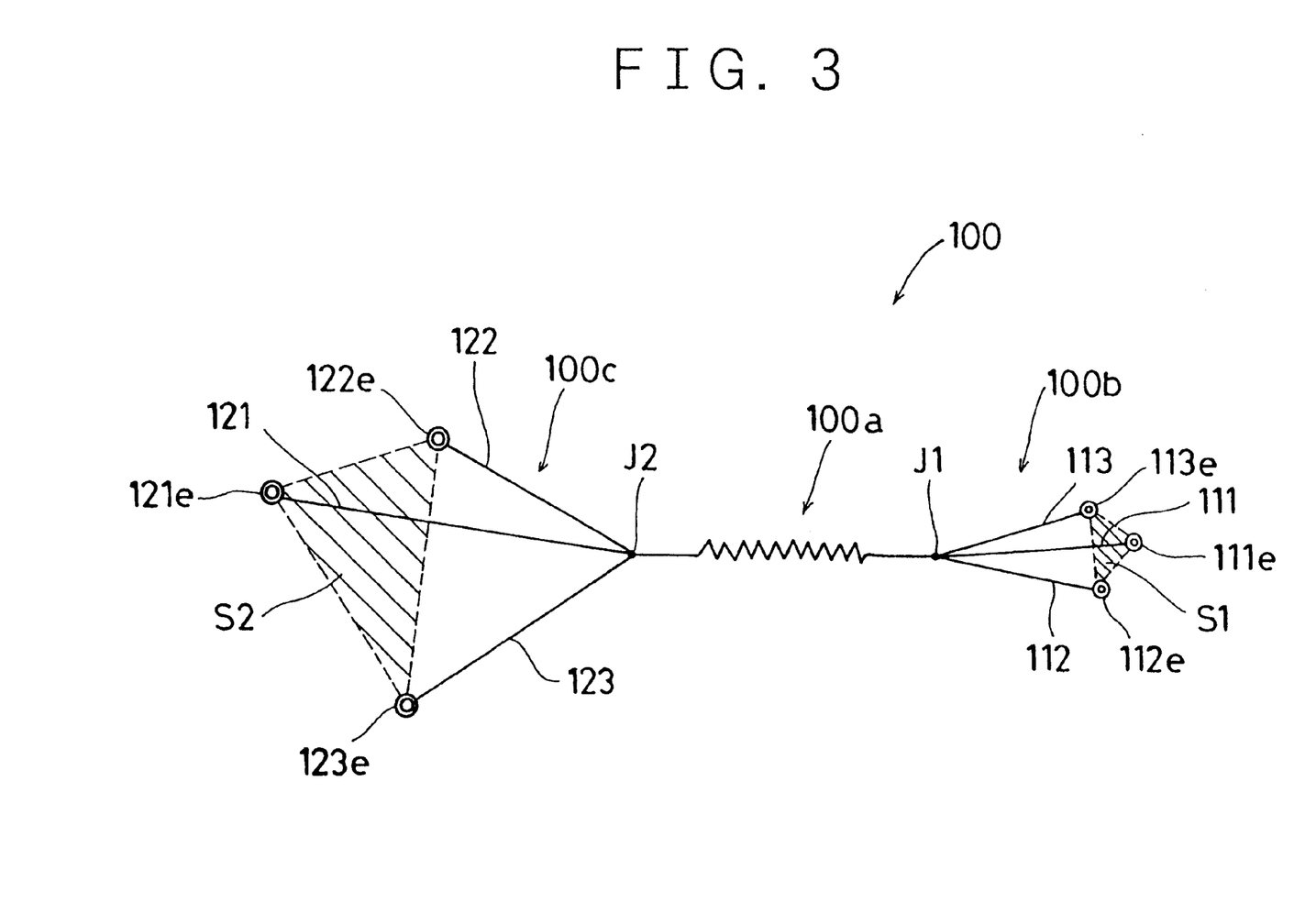
FIG. 3 is a view for illustrating a motion transfer member of the present invention.

Referring to FIG. 3, the motion transfer member 100 is formed of an elastic portion 100a and trifurcated portions 100b and 100c. Each of the trifurcated portions 100b and 100c has three wires separated from the respective ends of the elastic portion 100a. The elastic portion 100a may be in the form of an elastic element such as rubber, spring, or the like. The trifurcated portions 100b and 100c may be in the form of a non-elastic element such as a wire. The wires 111 to 113 constituting the trifurcated portion 100b are connected to a joint J1 at one end, while the wires 121 to 123 constituting the trifurcated portion 100c are connected to a joint J2 at one end. The joint J1 is provided at one end of the expandable portion 100a, while the joint J2 is provided at the other end thereof. One end of the wire 60 on the side of the teaching pen 10 is joined at the joint J1. The ring-shaped end points 111e to 113e of the respective wires 111 to 113 and ring-shaped end points 121e to 123e of wires 121 to 123 which form the respective trifurcated portions 100b and 100c are connected with the teaching pen 10 and the teaching compass 30, respectively. The respective three end points 111e to 113e and 121e to 123e are attached to the teaching pen 10 and the teaching compass 30 such that planes S1 and S2 are defined by plotting the three end points, respectively. The attachment of those end points will be described later referring to FIGS. 4 to 7.

Figure 4:
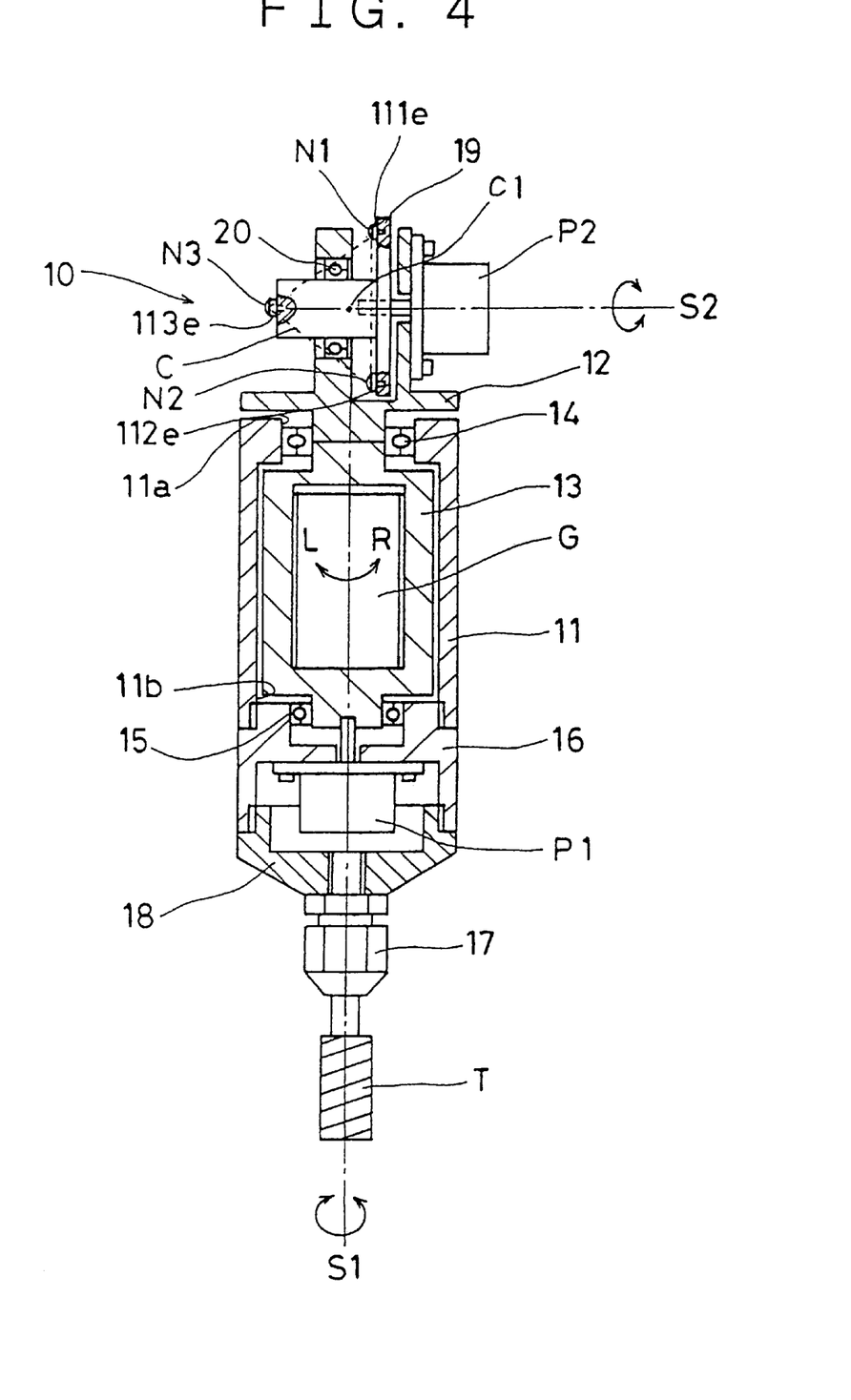
FIG. 4 is a longitudinal sectional view of a teaching pen of the present invention.

Referring to FIG. 4, the teaching pen 10 will be described in detail.

There is an opening 11a formed at one end of a grip member 11 gripped by an operator's hand. The opening 11a is supported by a bearing 14 fitted in a portion where a pivot support member 12 is bonded to an inclination sensor support member 13 that holds an inclination sensor G therein. There is an opening 11b formed at the other end of the grip member 11. The opening 11b is supported by a bearing 15 fitted in the inclination sensor support member 13 via a rotation support member 16 attached to the opening 11b. The grip member 11, thus, is pivotally supported around a pivot axis S1. A relative angle defined by the grip member 11 and the inclination sensor support member 13 with respect to the pivot axis S1 can be detected by a potentiometer P1. The inclination sensor G is capable of detecting an attitude of the dummy tool T in the L-R direction as shown in FIG. 4, that is, the attitude with respect to the direction of gravity.

In the case where the pivot axis of the tool used for actual working operations coincides with the pivot axis S1 as shown in FIG. 4, the relative angle does not have to be detected. In the case where the pivot axis of the tool does not coincide with the pivot axis S1, that is, the pivot axis of the dummy tool T fitted in the grip member 11 does not coincide with the pivot axis S1, the pivot axis of the dummy tool T changes as the grip member 11 rotates. Therefore, the position of the dummy tool T has to be derived from the angle detected by the potentiometer P1.

Provided at one end of the rotation support member 16 is a dummy tool support member 18 having a chuck 17 to which the dummy tool T is removably attached.

Supported above the pivot support member 12 via a bearing 20 is a disk 19 having a projection C, which is allowed to rotate around a pivot axis S2 perpendicular to the pivot axis S1.

The end point 111e of the wire 111 of the motion transfer member 100 is attached to the disk 19 with a bolt N1. The end point 112e of the wire 112 is attached with a bolt N2 to a position opposite to the bolt N1 on the disk 19, which disposes the pivot axis S2 therebetween.

The end point 113e of the wire 113 is attached to an end portion of the projection C with a bolt N3.

The aforementioned end points 111e to 113e are loosely attached to the respective bolts N1 to N3 and not completely secured thereto, so that they can rotate around the respective bolts N1 to N3 to a certain degree. The joint J1 where the wires 111 to 113 are joined at one end is located on a center of gravity C1 of a triangle (shown in the dotted line) defined by plotting the points of the bolts N1 to N3.

Figure 5:
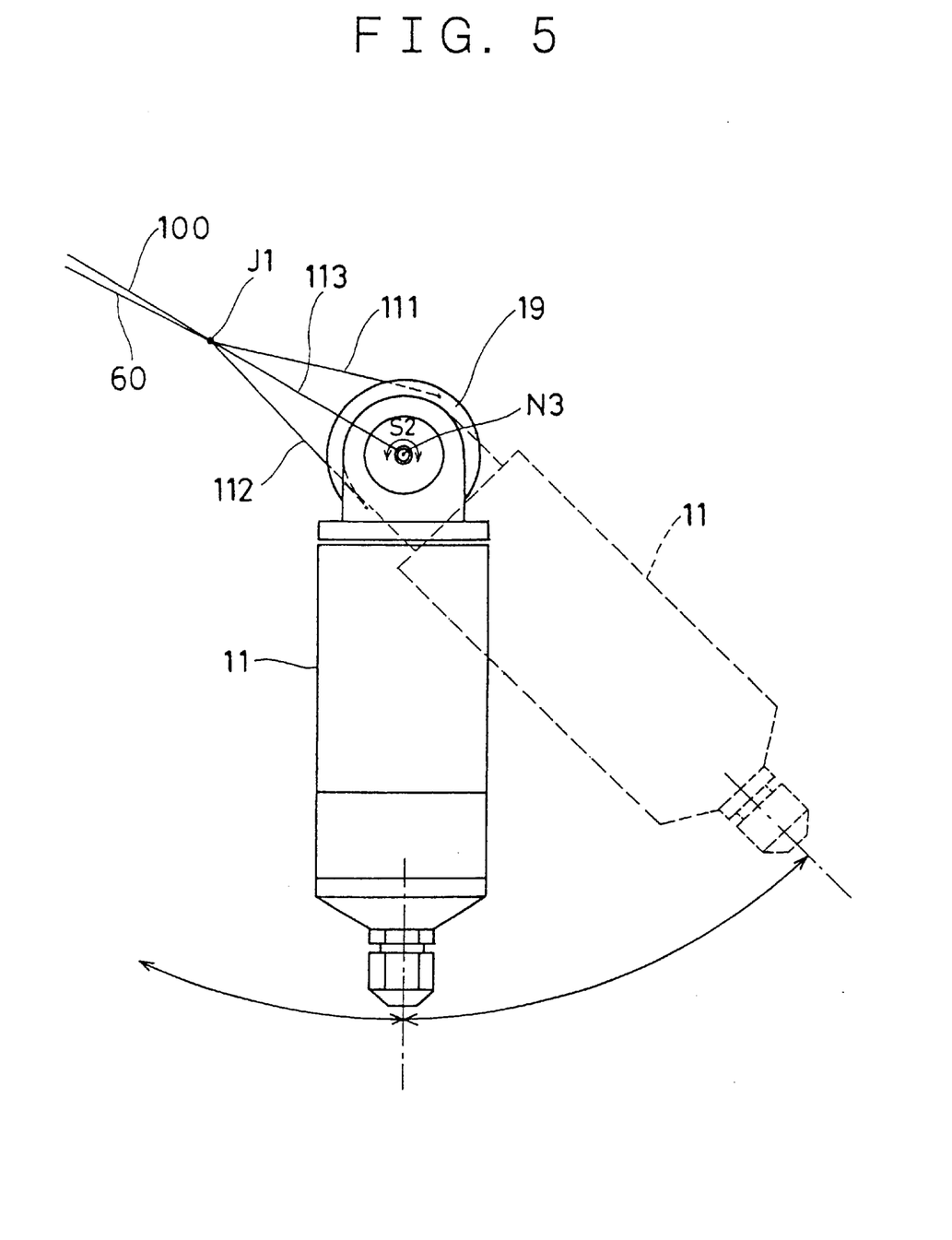
FIG. 5 shows how an attitude of a teaching pen is detected by an inclination sensor.

When the grip member 11 is brought into the position as shown by the dotted line of FIG. 5, the disk 19 is pulled by the motion transfer member 100. Under the conditions where rotational motions of the disk 19 are restricted, the grip member 11 further rotates around the pivot axis S2. A potentiometer P2 detects a relative angle generated between the grip member 11 and the disk 19 around the pivot axis S2.

Figure 6:
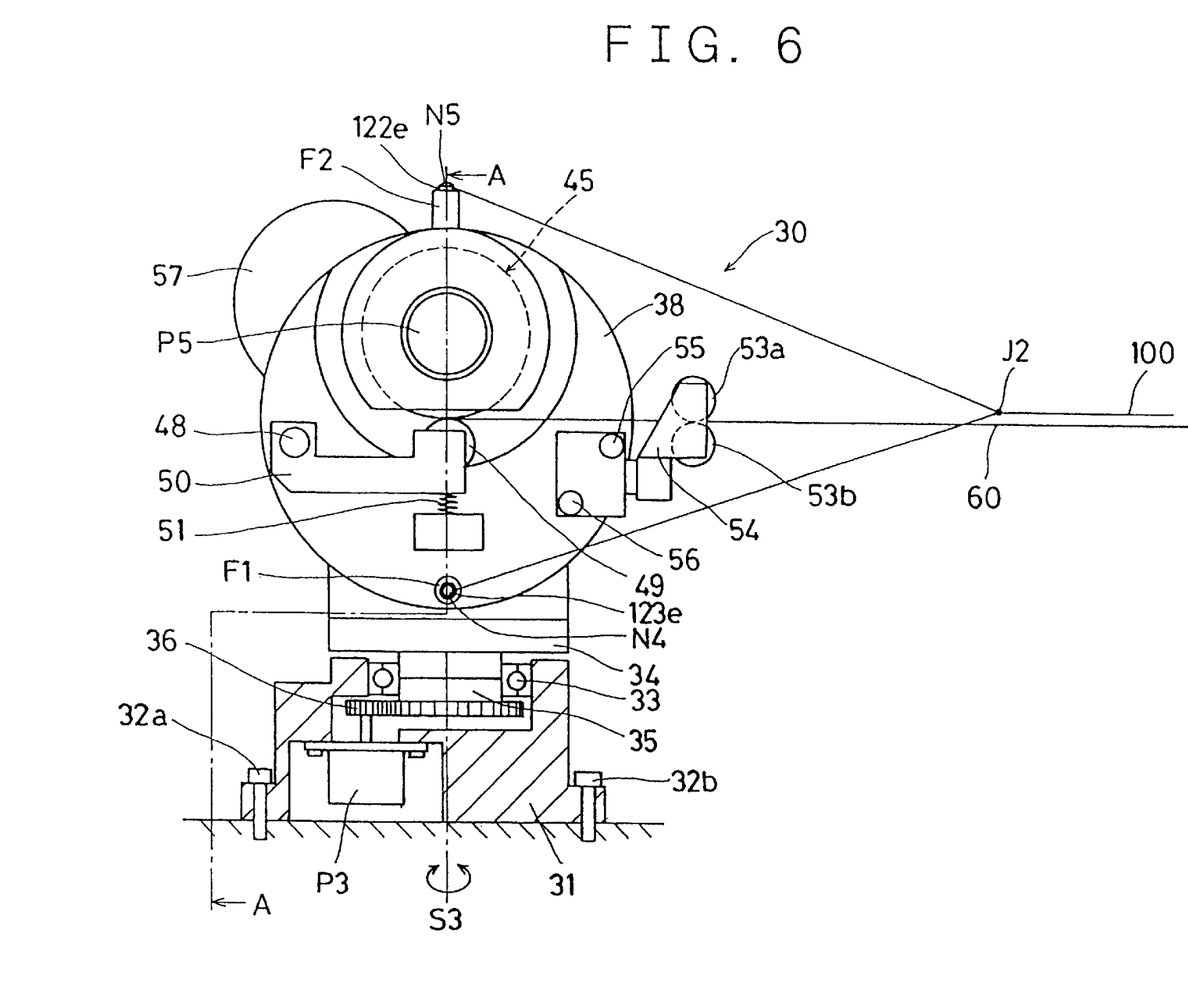
FIG. 6 is a view for illustrating a teaching compass of the present invention in detail.
Figure 7:
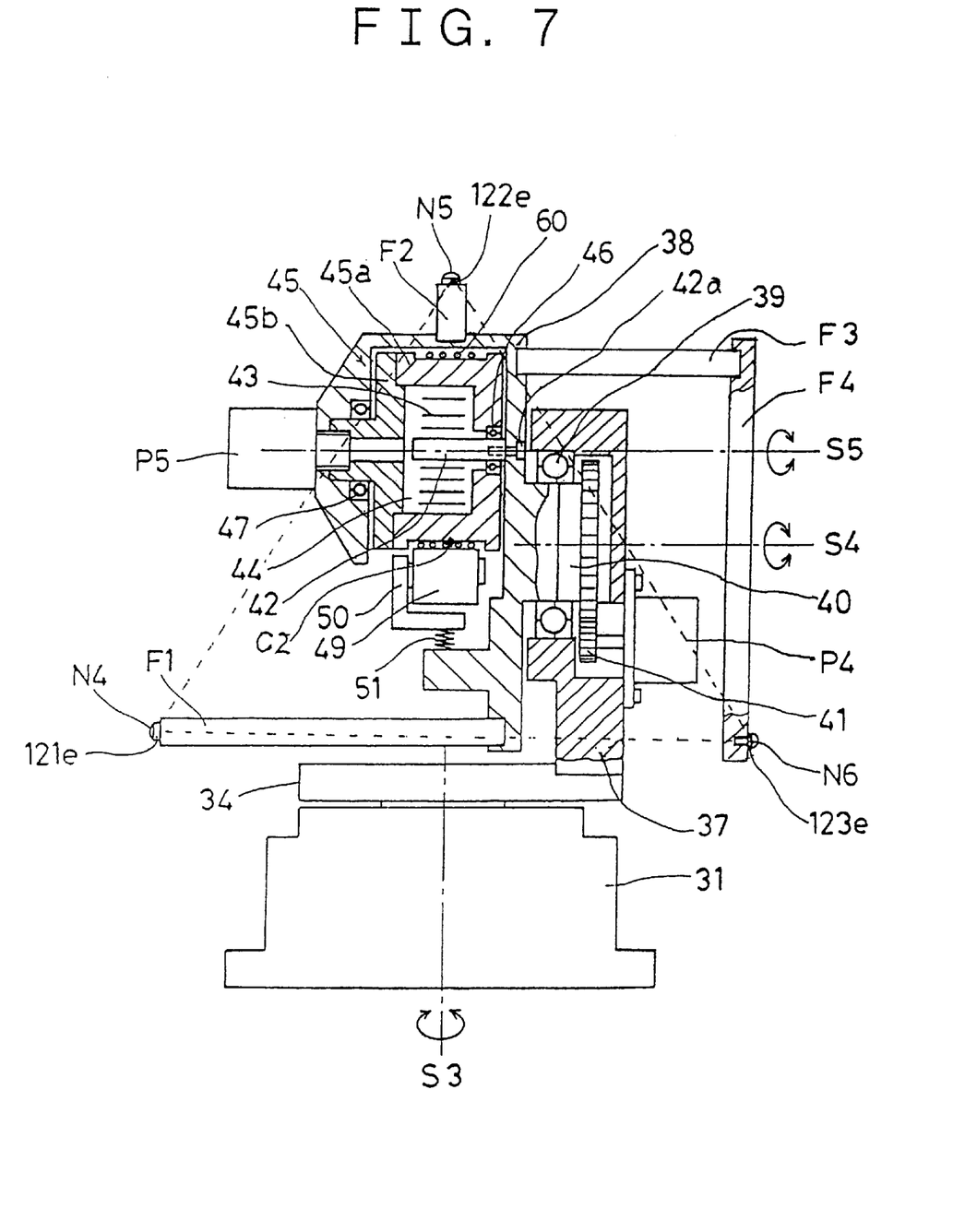
FIG. 7 is a sectional view of the teaching compass taken along line A—A of FIG. 6.

Referring to FIGS. 6 and 7, the teaching compass 30 will be described in detail.

A base 31 is placed around a table on which a workpiece is set or on a guard which keeps operators from entering the working area so as to be located above the robot. The base 31 is secured with bolts 32a and 32b to such a place where general working operations are not disturbed.

A rotation table 34 is supported above the base 31 via a bearing 33, which is allowed to rotate around a pivot axis S3. The rotational motion of the rotation table 34 is transferred to a potentiometer P3 via a gear 35 secured onto the rotation table 34 with a bolt (not shown) and a gear 36 that pivots around an axis in parallel with the gear 35. As a result, the position of the rotation table 34 in motion can be detected by the potentiometer P3.

Secured onto the rotation table 34 with a bolt (not shown) is a projection member 37 extending in the direction of a pivot axis S3 thereof. A pivot table 38 is connected with the projection member 37 via a bearing 39 such that the pivot table 38 is allowed to pivot around a pivot axis S4 perpendicular to the pivot axis S3. The pivot motion of the pivot table 38 can be detected by a potentiometer P4 via gears 40 and 41 integrated with the pivot table 38 with a bolt (not shown).

An shaft 42 is secured onto the pivot table 38 with a bolt 42a so as to be concentric with the pivot axis S5 in parallel with the pivot axis S4. Supported at the shaft 42 is a take-up reel 45 having a take-up member 45a containing a spring housing 44 for enclosing a coil spring 43 therein and a lid member 45b via bearings 46 and 47 such that the take-up reel 45 is allowed to rotate around the pivot axis S5. The coiled spring 43 in the spring housing 44 is so formed to be wound around the shaft 42. One end of the coil spring 43 is attached to the shaft 42 and the other end is attached to the take-up reel 45. Referring to FIGS. 6 and 7, there is provided an arrangement such that the point from which the wire 60 is fed by the take-up reel 45, the pivot axis S5 of the pivot table 38 and the pivot axis S3 of the rotation table 34 intersect one another. When the wire 60 wound by the take-up reel 45 is pulled in the above-described arrangement, the take-up reel 45 starts rotating in such a direction as to feed the wire 60 under the urging force of the spring 43. When the force that pulls the wire 60 is diminished, the take-up reel 45 starts winding up the wire 60 with the aid of the force of the spring 43.

The amount of rotation of the take-up reel 45 can be detected by a potentiometer P5. An output value of the potentiometer P5 is proportional to the length of the wire 60 fed from the take-up reel 45. Therefore the distance between the teaching pen 10 connected with one end of the wire 60 and the teaching compass 30 is derived from the output value.

Provided above the pivot table 38 is a wire urging member 50, one end of which is pivotally attached to a pivot shaft 48 projecting from the pivot table 38 and, the other end of which is provided with a roller 49 abutting on the wire 60 wound around the take-up reel 45. The urging force of the wire urging member 50 can be adjusted by an urging spring 51.

Secured onto the pivot table 38 with bolts 55 and 56 is a guiding member 54, which has a pair of upper guiding roller 53a and a lower guiding roller 53b interposing the wire 60 therebetween. The guiding member 54 serves to control feeding and taking-up of the wire 60 at the same position constantly.

The pivot table 38 has a balance weight 57 secured thereto with a bolt (not shown). The balance weight 57 serves to eliminate the measurement error by preventing the wire 60 from being bent by the torque caused by an unbalanced center of gravity. The balance weight 57 further allows the pivot table 38 to improve its characteristic to follow the rotational motion around the pivot axis S4.

As shown in FIGS. 6 and 7, one end of a flange F1 extending in parallel with the pivot axis S4 and one end of a flange F2 extending in parallel with the pivot axis S3 are secured to the pivot table 38 with screws, respectively. The end point 121e of the wire 121 is attached to the other end of the flange F1 with a bolt N4. The end point 122e of the wire 122 is attached to the other end of the flange F2 with a bolt N5. One end of a flange F4 for taking up the wire is supported by one end of a flange F3 having the other end secured to the upper portion of the pivot table 38 with a screw. The end point 123e of the wire 123 is attached to the other end of the flange F4 with a bolt N6. The aforementioned end points 121e to 123e are loosely attached to the respective bolts N4 to N6 and not completely secured thereto, so that they can rotate around the respective bolts N4 to N6 to a certain degree. The joint J2 where the wires 121 to 123 are joined at one end is located on a center of gravity C2 of a triangle (shown in the dotted line) defined by plotting the points of the bolts N4 to N6.

The present invention will be further described referring to FIG. 2.

An A/D converter 70 converts analogue values detected by the potentiometers P1 to P5 and the inclination sensor G into digital data. Values output from the A/D converter 70 are input to a coordinate converter 80.

The coordinate converter 80 is connected with a teaching pendant 81 on which a guiding button 82 is provided. In response to depression of the guiding button 82, the respective outputs of the potentiometers P1 to P5 and the inclination sensor G are sampled by the coordinate converter 80.

When the guiding button 82 is depressed by the operator, based on sampled outputs of the potentiometers P1 to P5 and the inclination sensor G, the coordinate converter 80 is activated to obtain a guiding point of the teaching pen 10 represented by a teaching compass coordinate (Xt, Yt, Zt) as a position where the teaching compass 30 is located. The obtained guiding point as the coordinate (Xt, Yt, Zt) of the teaching compass 30 is vector-defined by using a known calibration operation with respect to a robot coordinate (Xr, Yr, Zr) based on a position where a robot R is located. More specifically, the coordinate converter 80 functions in converting the guiding data derived from the teaching compass coordinate (Xt, Yt, Zt) into the guiding point data as the robot coordinate (Xr, Yr, Zr).

Completing the above-described conversion from all guiding points into the corresponding robot coordinate (Xr, Yr, Zr), the coordinate converter 80 transfers the converted data to a robot control unit 90 for storing them as the guiding data.

The robot control unit 90 is connected with the robot R to be controlled thereby and an operating box (not shown). The operating box serves to instruct inputting of the program for controlling the robot R, the program execution, or the like.

Operations of the above-described teaching pen 10 and the teaching compass 30 for deburring will be described hereinafter.

When the operator grips the teaching pen 10 for operation, three wires 111 to 113 connected therewith pull the wires 121 to 123 under the tension exerted by an expandable portion 100a. Each of the end points 121e to 123e of the wires 121 to 123 receives a uniform tensile force such that the teaching compass 30 starts following the movement of the teaching pen 10. The aforementioned operations can be compared to hauling the string of a flying kite.

Referring to FIG. 2, the operation for guiding the robot to a deburring position is described.

The operating box 81 connected with a robot control unit 90 is set at a teaching mode.

Then a dummy tool T is fitted in the teaching pen 10. The dummy tool T has the identical shape to that of the tool used for actual deburring operations.

The operator grips the teaching pen 10 by one hand and the teaching pendant 81 by the other hand.

The operator brings the teaching pen 10 into such a position that the dummy tool T is set to a deburring position B on a workpiece at a desired attitude. In response to depression of the guiding button 82, output values of the potentiometers P1 to P5 and the inclination sensor G are input to the coordinate converter 80 via the A/D converter 70. The coordinate converter 80 derives guiding data of the teaching compass coordinates (Xt, Yt, Zt) from output values of the potentiometers P1 to P5 and inclination sensor G that have been input. The coordinate converter 80 further converts the derived guiding data into the guiding data of the robot coordinate (Xr, Yr, Zr). The robot coordinate (Xr, Yr, Zr) thus converted is stored in a memory (not shown) of the coordinate converter 80.

The aforementioned operations are repeated so that the robot R is guided to the deburring position B.

The motion transfer member 100 is provided in order to transfer the movement of the teaching pen 10 to the teaching compass 30. Additionally each of the end points 111e to 113e of 3 wires 111 to 113 connected with the teaching pen 10 and each of the end points 121e to 123e of 3 wires 121 to 123 connected with the teaching compass 30 receive a uniform tensile force applied by those wires 111 to 113, 121 to 123 and the expandable portion 100a accompanied by the movement of the teaching pen 10 (see FIG. 3 where each end point of the planes S1 and S2 defined by wires 111 to 113 and wires 121 to 123 respectively is pulled by a uniform force.) As a result, the teaching compass 30 can follow the movement of the teaching pen 10 so precisely that the position thereof can be detected precisely.

In this embodiment, the teaching pen 10 is connected with the teaching compass 30 at the respective three end points of trifurcated wire portions 100b and 100c that form the motion transfer portion 100. However it is to be understood that the teaching pen 10 and the teaching compass 30 can be connected at, for example, 4 end points or any number of end points of wires so far as the plane can be formed by plotting the end points.

In this embodiment, the motion transfer member 100 is provided with the trifurcated wire portions 100b and 100c via the joints J1 and J2. The present invention may be constructed such that the respective joint end points of the teaching pen 10 and the teaching compass 30 are directly connected with the respective motion transfer members 100 without using the trifurcated wire portions 100b and 100c.

The present invention employs both the first motion transfer member (the wire 60) for detecting the distance between the guiding tool (the teaching pen 10) and the coordinate detector (the teaching compass 30), and the second motion transfer member (the motion transfer member 100) for detecting the attitude of the guiding tool separately, resulting in precise guiding data.

The joint portion between the second motion transfer member and the dummy tool and the joint portion between the second motion transfer member and the three-dimensional coordinate position detection means are maintained with at least three end points of wires. As this serves to apply a constant force to the respective three end points at the joint portions, the capability of the three-dimensional coordinate position detection means to follow the dummy tool movement can be improved, resulting in precise position detection.

The dummy tool and the three-dimensional coordinate position detection means are connected via a second motion transfer member having an expandable portion for transferring the dummy tool movement to the three-dimensional coordinate position detection means. In the case of guiding the robot, the expandable portion of the second motion transfer member constantly applies a tensile force between the dummy tool and the three-dimensional coordinate position detection means. This arrangement proves the capability of the three-dimensional coordinate position detection means to follow the dummy tool movement.

While the present invention has been described with reference to preferred embodiments thereof, it is to be understood that the invention is not limited to the disclosed embodiments or construction. To the contrary, the invention is intended to cover various modifications and equivalent arrangements included within the spirit and scope of the appended claims.

What is claimed is:

1. A robot teaching machine comprising:

a guiding tool provided with a first angle sensor;

a coordinate detector provided with a plurality of rotating portions and a second angle sensor for detecting a rotational angle of each of said rotating portions;

a first motion transfer member for detecting a distance between said guiding tool and said coordinate detector that are connected with each other;

a second motion transfer member for connecting said guiding tool and said coordinate detector and detecting an attitude of said guiding tool; and a coordinate converter for deriving a three-dimensional coordinate position and the attitude of said guiding tool from values detected by said first and said second angle sensors respectively.

2. The robot teaching machine according to claim 1, wherein a joint portion between said second motion transfer member and said guiding tool and a joint portion between said second motion transfer member and said coordinate detector are maintained with at least three end points, respectively.

3. The robot teaching machine according to claim 2, wherein said second motion transfer member is provided an expandable portion.

4. The robot teaching machine according to claim 1, wherein said first angle sensor of said guiding tool is formed of one inclination sensor and two potentiometers.

5. The robot teaching machine according to claim 1, wherein said second angle sensor of said coordinate detector is formed of three potentiometers.

6. The robot teaching machine according to claim 1, wherein said first and second motion transfer members are formed of wires.

* * * * *